Aug. 27, 1963 A. C. WEST 3,101,574
COTTON PICKER SPINDLE SHARPENER
Filed Aug. 6, 1962 2 Sheets-Sheet 1
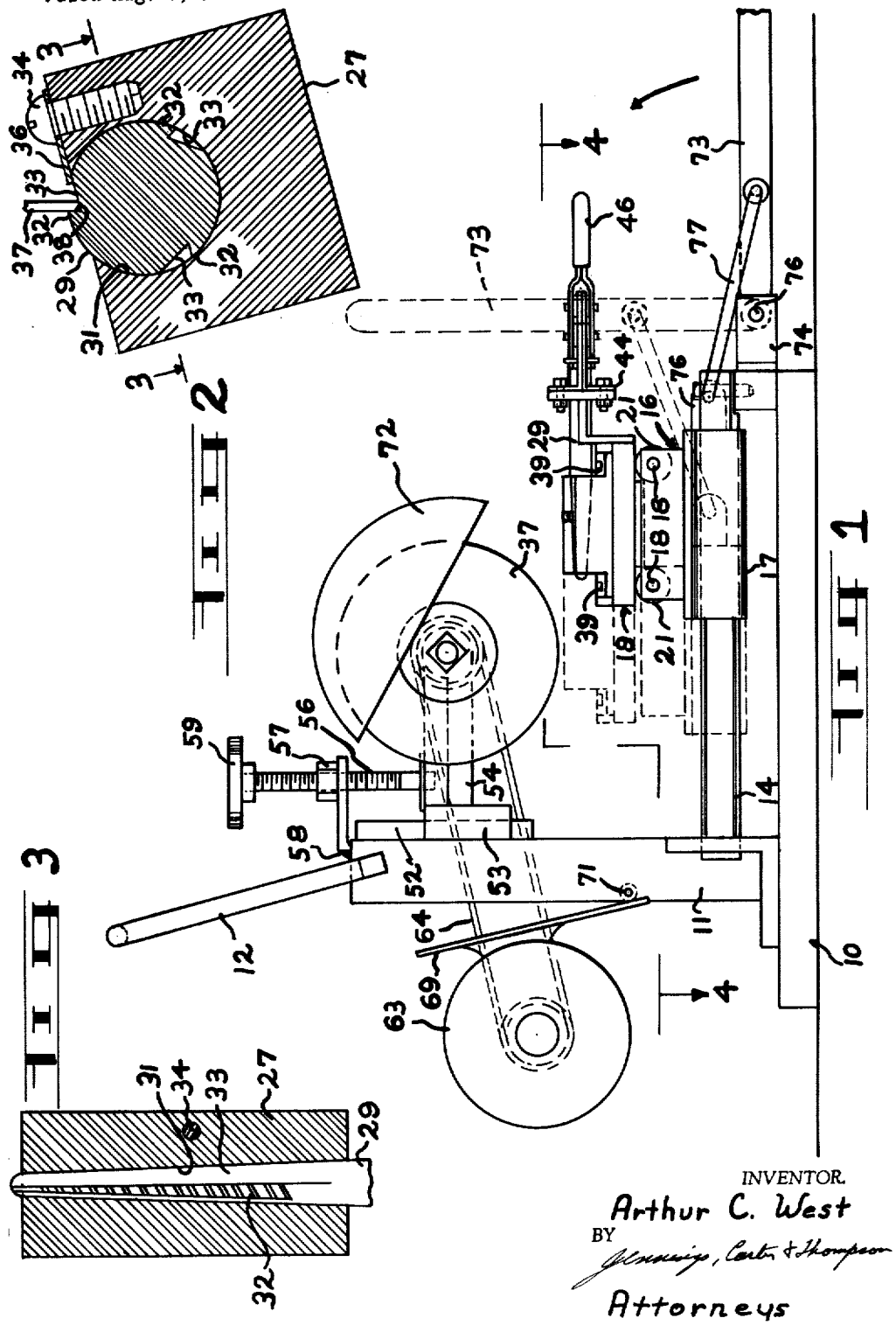
INVENTOR.
Arthur C. West
BY
Jennings, Carter & Thompson
Attorneys

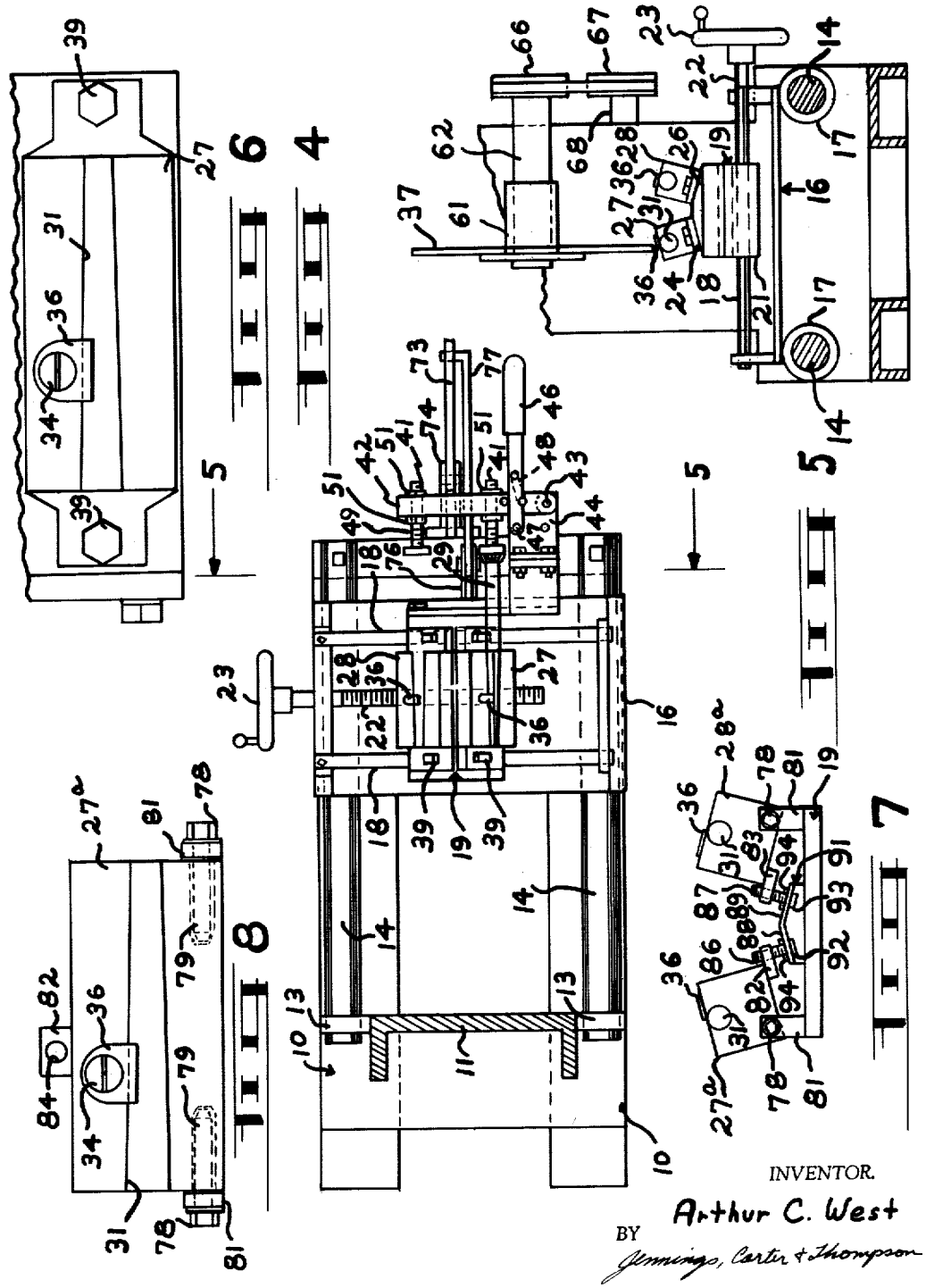

United States Patent Office 3,101,574
Patented Aug. 27, 1963

1

3,101,574
COTTON PICKER SPINDLE SHARPENER
Arthur C. West, E. Sunflower Road, Cleveland, Miss.
Filed Aug. 6, 1962, Ser. No. 214,899
8 Claims. (Cl. 51—92)

This invention relates to a cotton picker spindle sharpener and more particularly to apparatus which shall be adapted for sharpening cotton picker spindles without having to remove the spindle nut, thereby greatly reducing the time and effort required to sharpen a spindle.

An object of my invention is to provide a cotton picker spindle sharpener of the character designated which shall be compact and adapted for transporting from place to place, whereby the spindles may be sharpened in individual shops or at the farm.

Another object of my invention is to provide a cotton picker spindle sharpener of the character designated which shall be adapted for sharpening both right and left hand spindles, that is, spindles having right and left hand barbs, thereby eliminating the necessity of employing two separate machines.

A further object of my invention is to provide a cotton picker spindle sharpener of the character designated which shall be adapted for making an accurate undercut of the barb of the spindle whereby the effectiveness and performance of the spindle is improved greatly.

A still further object of my invention is to provide a cotton picker spindle sharpener of the character designated which shall be simple of construction, economical of manufacture and one which will sharpen a spindle in a minimum of time, thereby reducing the overall cost of sharpening spindles.

Heretofore in the art to which my invention relates, cotton picker spindles have been sharpened by hand held work pieces or spindle guides. This method of sharpening cotton picker spindles is not only time consuming but the spindles are not sharpened accurately, thereby reducing greatly the effectiveness and performance of the spindle. As is well known in the art to which my invention relates, the accuracy at which the undercut of the barb is made determines the degree of effectiveness of the spindle. With hand held work pieces and spindle guides, it is very difficult to position the spindle relative to the cutting tool whereby the proper undercut is made. That is, the approximate position is obtained by guesswork.

To overcome the above and other difficulties, I provide a cotton picker spindle sharpener in which the spindle is aligned accurately with the cutting tool each time a cut is made thereby assuring that the proper undercut of the barb is made each time a spindle is sharpened. To reduce the overall time required to sharpen a spindle, I provide apparatus which will sharpen a spindle without having to remove the spindle nut. Also, my improved apparatus is adapted for sharpening both right and left hand spindles. My improved spindle sharpener is not only compact and adapted for transporting from place to place, but is adapted for sharpening various types of spindles, such as spindles produced by different manufacturers.

Apparatus embodying features of my invention is illustrated in the accompanying drawings forming a part of this application, in which:

2

FIG. 1 is a side elevational view of the apparatus showing a spindle in place;

FIG. 2 is an enlarged, fragmental view showing the spindle holder and the manner in which the sharpening tool engages the spindle;

FIG. 3 is a sectional view, drawn to a smaller scale, taken generally along the line 3—3 of FIG. 2:

FIG. 4 is a sectional view taken generally along the line 4—4 of FIG. 1;

FIG. 5 is a sectional view taken generally along the line 5—5 of FIG. 4;

FIG. 6 is a fragmental, top plan view showing the spindle holder;

FIG. 7 is a detail view showing a modified form of my invention wherein the position of the spindle holder may be adjusted to vary the angle of undercut; and, FIG. 8 is a top plan view of the apparatus shown in FIG. 7.

Referring now to the drawings for a better understanding of my invention, I show a supporting frame 10. Mounted adjacent one end of the supporting frame 10 is an upstanding channel member 11 which carries a handle 12 at the upper end thereof, which may be in the form of a U-member, or the like. Supported adjacent opposite sides of the supporting frame 10 by suitable supports indicated generally at 13, are elongated guide rods 14.

Mounted for sliding movement on the guide rods 14 is a movable frame 16. As shown in FIG. 5, the movable frame 16 is provided with depending bearing blocks 17 at opposite sides thereof which are adapted to receive the guide rods 14 with a sliding fit whereby the movable frame 16 is adapted for longitudinal movement relative to the guide rods 14.

Secured to and extending transversely of the movable frame 16 are spaced guide rods 18 which support a transverse movable frame 19. Depending bearing members 21 are carried by the movable frame 19 in position to receive the guide rods 18 with a sliding fit. The frame 19 is moved transversely of the frame 16 by a threaded shaft 22 which extends through a suitable threaded opening provided through the movable frame 19. The shaft 22 is rotated by a suitable hand wheel 23 to whereby move the frame 19 transversely of the frame 16.

The movable frame 19 is provided with inclined surfaces 24 and 26 which slope away from each other, as shown in FIG. 5. Mounted on the inclined surfaces 24 and 26 are spindle holders 27 and 28, respectively, which are adapted to hold the spindles to be sharpened indicated generally at 29. By providing spindle holders 27 and 28 which are inclined in opposite directions away from each other, the apparatus is adapted for sharpening both right and left hand spindles, that is, spindles having left hand barbs and spindles having right hand barbs.

Each spindle holder 27 or 28, as the case may be, is provided with a tapered recess 31 therein for receiving the tapered spindle 29, as clearly shown in FIG. 3. As shown in FIG. 2, the upper surface of the spindle holder is cut away to expose the portion of the spindle 29 to be sharpened. As shown in FIGS. 2 and 3, the spindle 29 is provided with the usual barbs 32 which are disposed adjacent a relatively flat portion 33 that extends longitudinally of the spindle 29. As shown in FIG. 2, each spindle comprises a plurality of longitudinally extending barb portions 32 and flat portions 33 which are disposed at angular positions, as viewed in transverse cross section.

Secured to the top of each spindle holder, by suitable means, such as a screw 34, is an inwardly extending stop or detent 36 which is adapted to engage the flat, longitudinally extending portion 33, as shown in FIG. 2, to thereby position the spindle 29 accurately within the spindle holder. That is to say, the spindle 29 is held in proper position to be engaged by a rotary sharpening tool indicated generally at 37. Since the spindle holders 27 and 28 are inclined, the rotary sharpening tool 37 makes an undercut 38 adjacent the flat, longitudinally extending portion 33 to thereby sharpen the spindle. As pointed out above, the accuracy at which the undercut 38 is made in the longitudinally extending barb portion 32 determines the degree of effectiveness of the spindle. The spindle holders 27 and 28 are secured to the movable frame 19 by suitable means, such as bolts 39.

The spindles 29 are locked within the tapered recesses in the spindle holders 27 and 28 by elongated, spindle engaging members 41 which are carried by a lever arm 42 in position to lie in axial alignment with the spindles 29. The lever arm 42 is pivotally connected by a pivot pin 43 to a supporting bracket 44 carried by the movable frame 19. The lever arm 42 is moved about the pivot pin 43 by a suitable actuating lever arm 46 which is pivotally connected to the bracket 44 by a pivot pin 47. The lever arm 46 is operatively connected to the lever 42 by a suitable connecting member 48 which locks the lever 42 in the position shown in FIG. 4 when the connecting member 48 is moved past dead center. On the other hand, when the lever arm 46 is rotated in a clockwise direction, as viewed in FIG. 4, the connecting member 48 moves to the opposite side of dead center whereby the lever 42 is pivoted about its pivot point 43 to thus withdraw the spindle engaging members 41, whereupon the spindles may be removed from the spindle holders 27 or 28, as the case may be. The spindle engaging members 41 are threaded as at 49 for receiving lock nuts 51 which are disposed at opposite sides of the lever 42 whereby the spindle engaging member 41 may be held in selected positions. That is, the effective length of the spindle engaging members 41 may be adjusted by the adjusting nut 51.

Mounted on the upstanding channel member 11 is a vertically extending guide member 52 which is adapted to receive a support bracket 53 with a sliding fit. The guide member 52 and the support bracket 53 may be of a dove-tail shape, as viewed in cross section whereby the members are adapted for longitudinal movement relative to each other but are held against lateral movement relative to each other. Secured to and supported by the support bracket 53 is a vertically movable frame 54 which is held in selected vertical positions by a threaded shaft 56. The threaded shaft 56 is in threaded engagement with an internally threaded support bracket 57 which is secured rigidly to the top of the vertical channel member 11 as at 58. The threaded shaft 56 carries a hand wheel 59 whereby upon rotating the hand wheel, the threaded shaft 56 moves axially relative to the supporting member 57.

Mounted on the vertically movable frame 54 is a bearing bracket 61 which supports a rotatable shaft 62 that in turn carries the sharpening tool 37. The shaft 62 is driven by a motor 63 through a V-belt 64 and pulleys 66 and 67, the pulley 66 being mounted on shaft 62 and the pulley 67 being mounted on the motor shaft 68. As shown in FIG. 1, the motor 63 is supported by a movable plate 69 which is pivotally supported as at 71 to the upstanding channel member 11 whereby the proper pressure is exerted on the belt 64 for driving the sharpening tool 37. Preferably, a guard member 72 is mounted over the rotary sharpening tool 37.

To move the movable frame 16, together with the movable frame 19 carried thereby, I provide an operating lever 73 which is pivotally mounted to a support bracket 74 by a suitable pivot pin 76. The operating lever 73 is operatively connected to an outstanding bracket 76 carried by the movable frame 17 by an actuating rod 77. Accordingly, upon moving the operating lever 73 from the solid line position shown in FIG. 1 to the dotted line position, the movable frames 16 and 19 move from the solid line position to the dotted line position whereupon the spindle holders move longitudinally beneath the spindle sharpening tool 37 to thereby cause the rotary sharpening tool 37 to make the undercut 38 adjacent the barb portion 32.

From the foregoing description, the operation of my improved spindle sharpener will be readily understood. The spindle to be sharpened is inserted in its holder 27, or 28, as the case may be. If the longitudinally extending flat portion 33 is positioned at the right of the barb portion 32, the spindle is inserted in the holder 27. On the other hand, if the longitudinally extending flat portion 33 is positioned at the left side of the barb portion 32, the spindle is inserted in the holder 28. After insertion of the spindle 29 in the opening 31, the spindle is rotated counterclockwise, where the spindle is inserted in holder 27 and is rotated clockwise when the spindle is inserted in the holder 28 whereupon the flat detent 36 engages the flat portion 33 to position the spindle in the correct position for grinding. The spindle is then locked in this position by rotating the lever arm 46 in a counterclockwise direction, as viewed in FIG. 4, whereupon the spindle engaging member 41 engages the end of the spindle 29 to lock the spindle within the holder. It will be noted that only one of the spindle holders is employed at a single time.

With the spindle thus locked within the tapered recess 31, the hand wheel 59 is rotated in a direction to adjust the position of the sharpening tool 37 whereby it grinds the point of the spindle barb, as shown in FIG. 2, to form the undercut 38. With the spindle thus in alignment with the sharpening tool 37, the operating lever 73 is moved from the solid line position shown in FIG. 1 to the dotted line position. As the sharpening tool 37 moves into engagement with the spindle, the movement of the lever 73 is slow. After the sharpening tool 37 has seated itself, movement of the operating lever 73 may be accelerated. The operating lever 73 is moved slowly at first due to the fact that rapid movement of the sharpening tool 37 before it has seated itself relative to the spindle may cause the sharpening tool to bend, thereby causing the cut to be off of the barb ends. Also, excessive bending of the sharpening tool may break the tool.

Where it is desired to move the sharpening tool 37 from one spindle holder to the other, the hand wheel 23 is rotated in the proper direction whereupon the transverse movable frame 19 is moved to position selected ones of the tool holders beneath the sharpening tool 37.

Referring now to FIGS. 7 and 8 of the drawings, I show spindle holders 27a and 28a which are mounted for adjustment relative to the sharpening tool whereby the angle of undercut may be varied. Instead of being mounted on inclined surfaces, the spindle holders 27a and 28a are supported adjacent the outer sides thereof by suitable pivot pins 78, which may be in the form of cap screws which engage threaded openings 79 provided in the spindle holders. Tapered recesses 31 are provided in the spindle holder 27a and 28a for receiving the spindles. Also, a laterally extending stop or detent 36 is provided to engage the flat, longitudinally extending portion 33 of the spindle, as described hereinabove.

The pivot pins 78 pass through suitable supporting brackets 81 which in turn are mounted on the movable frame indicated generally at 19, whereby the spindle holders are moved to selected positions as described hereinabove. Laterally projecting brackets 82 and 83 are carried by the sides of the spindle holders 27a and 28a, respectively, opposite the sides thereof carrying the pivot pins 78. A threaded opening 84 is provided in each of the brackets 82 and 83 for receiving threaded members 86 and 87, respectively. The lower ends of the threaded members 86 and 87 pass through suitable openings provided in sloping flanges 88 and 89 of a supporting bracket 91. The lower ends of the threaded members are provided with heads 92 and 93 which are adapted to be engaged by a suitable actuating tool whereby the threaded members may be rotated. As shown in FIG. 7, the lower portions of the threaded members which pass through the sloping flanges 88 and 89 are not threaded whereby the members 86 and 87 are adapted for free rotation relative to the supporting bracket 91. Axial movement of the threaded members 86 and 87 relative to the sloping flanges 88 and 89 is limited by suitable collars 94 which are secured to the threaded members 86 and 87.

In operation, the spindle holders 27ª and 28ª are adjusted about their pivot pins 78 by rotating the threaded members 86 and 87 in the proper direction. Accordingly, the operator may readily adjust the position of the spindle holders 27ª and 28ª whereby any desired undercut may be made in the spindle to be sharpened. With the spindle holders 27ª and 28ª thus adjusted to a proper position, the apparatus shown in FIGS. 7 and 8 is operated as described hereinabove to sharpen spindles.

From the foregoing, it will be seen that I have devised an improved cotton picker spindle sharpener which may be operated with a minimum of effort to sharpen spindles both accurately and with speed. By providing a spindle holder which retains the spindle in a predetermined set position each time a spindle is inserted therein and then rotated, my improved apparatus may be operated by unskilled labor and still obtain accurate sharpening of the spindle. That is, the operator merely inserts the spindle and rotates the same to the right or left, as the case may be, whereupon the detent 36 holds the spindle in a predetermined set position for the sharpening tool 37 to make the undercut 38 with a high degree of accuracy. Also, by providing quick acting means for locking the spindle within the tapered recess after the spindle has been accurately set therein, the spindles may be inserted and removed in a minimum of time. Furthermore, by providing a pair of oppositely inclined spindle holders, on the transverse movable frame, the apparatus is adapted for sharpening either right or left hand spindles. Preferably, a number of spindles are sharpened on a selected spindle holder 27 or 28, as the case may be, before the transverse frame is moved to position the other spindle holder beneath the sharpening tool, thereby saving time.

While I have shown my invention in but one form, it will be obvious to those skilled in the art that it is not so limited, but is susceptible of various changes and modifications without departing from the spirit thereof, and I desire, therefore, that only such limitations shall be placed thereupon as are specifically set forth in the appended claims.

What I claim is:
1. A cotton picker spindle sharpener comprising,
   (a) a holder adapted to receive a spindle to be sharpened and having a tapered recess therein which corresponds generally to the outer surface of the spindle to be sharpened,
   (b) there being an outwardly opening, longitudinally extending slot in said holder extending from the exterior of the holder to said tapered recess therein in position to expose a longitudinally extending portion of the spindle to be sharpened,
   (c) means to lock a spindle to be sharpened in said recess to retain the spindle in a predetermined fixed position relative to said holder,
   (d) a rotary sharpening tool in alignment with said longitudinally extending slot and disposed to make a longitudinally extending cut in a spindle to be sharpened while the spindle is locked within said holder,
   (e) means holding said sharpening tool and said holder at selected positions relative to each other to place said sharpening tool in longitudinal alignment with said longitudinally extending slot, and
   (f) means to impart relative movement between said holder and said sharpening tool to thereby make said longitudinally extending cut in a spindle to be sharpened.

2. A cotton picker spindle sharpener as defined in claim 1 in which the position of the holder relative to the sharpened tool is adjustable whereby the undercut made by the sharpening tool may be varied.

3. A cotton picker spindle sharpener as defined in claim 2 in which one side of the spindle holder is supported for pivotal movement and the opposite side thereof is supported by an adjustable support member.

4. A sharpener for a cotton picker spindle having at least one flat exposed surface extending longitudinally thereof comprising,
   (a) a holder having a tapered recess therein which corresponds generally to the outer surface of the spindle to be sharpened,
   (b) there being an outwardly opening, longitudinally extending slot in said holder extending from the exterior of the holder to said tapered recess therein in position to expose a longitudinally extending portion of the spindle to be sharpened,
   (c) a detent projecting inwardly of said slot and disposed to engage said flat exposed surface of the spindle to be sharpened to thereby hold the spindle in a fixed position relative to said holder,
   (d) means to lock a spindle within said tapered recess,
   (e) a rotary sharpening tool in alignment with said longitudinally extending slot and disposed to make a longitudinally extending cut in a spindle to be sharpened while the spindle is locked within said recess,
   (f) means holding said sharpening tool and said holder at selected positions relative to each other to place said sharpening tool in longitudinal alignment with said longitudinally extending slot, and
   (g) means to impart relative movement between said holder and said sharpening tool to thereby make said longitudinally extending cut in a spindle to be sharpened.

5. A cotton picker spindle sharpener as defined in claim 4 in which the means to lock a spindle to be sharpened within said tapered recess comprises,
   (a) a lever mounted for pivotal movement adjacent said holder,
   (b) a laterally projecting spindle engaging member carried by said lever and adjustable relative thereto,
   (c) and means to move said lever about its pivot point to thereby move said spindle engaging member into engagement with the end of a spindle to be sharpened whereby the spindle is locked within said recess.

6. A cotton picker spindle sharpener comprising,
   (a) a supporting frame,
   (b) a first movable frame mounted for longitudinal and transverse movement relative to said supporting frame,
   (c) a spindle holder mounted on said first movable frame adapted to receive a spindle to be sharpened and having a tapered recess therein which corresponds generally to the outer surface of the spindle to be sharpened,
   (d) there being an outwardly opening, longitudinally extending slot in said holder extending from the exterior of the holder to said tapered recess therein in position to expose a longitudinally extending portion of the spindle to be sharpened,
   (e) means to lock a spindle to be sharpened in said holder to retain the spindle in a predetermined fixed position relative to said holder,
   (f) a second movable frame mounted on said supporting frame for adjustment toward and away from said first movable frame,
   (g) a rotary sharpening tool carried by said second movable frame in alignment with said longitudinally extending slot and disposed to make a longitudinally extending cut in a spindle to be sharpened while the spindle is locked within said holder, (h) means to move said first frame transversely of said sharpening tool to place said tool in alignment with said longitudinally extending slot, and (i) means to move said first frame longitudinally of said sharpening tool to make said longitudinally extending cut in a spindle to be sharpened.

7. A cotton picker spindle sharpener as defined in claim 6 in which the spindle holder is mounted on said first movable frame at an angle whereby an undercut is made in the spindle to be sharpened.

8. A cotton picker spindle sharpener as defined in claim 6 in which both right and left hand spindle holders are mounted on said first movable frame.

References Cited in the file of this patent

UNITED STATES PATENTS

| | | |
|---|---|---|
| 667,321 | Keyes | Feb. 5, 1901 |
| 983,993 | Graef | Feb. 14, 1911 |
| 988,577 | Knapp | Apr. 4, 1911 |
| 2,252,879 | Calame | Aug. 19, 1941 |

Notice of Adverse Decision in Interference

In Interference No. 94,498 involving Patent No. 3,101,574, A. C. West, COTTON PICKER SPINDLE SHARPENER, final judgment adverse to the patentee was rendered Feb. 25, 1965, as to claims 1 and 2.

[*Official Gazette May 4, 1965.*]